United States Patent
Rising, III

(10) Patent No.: US 6,721,759 B1
(45) Date of Patent: Apr. 13, 2004

(54) TECHNIQUES FOR SPATIAL REPRESENTATION OF DATA AND BROWSING BASED ON SIMILARITY

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/220,614

(22) Filed: Dec. 24, 1998

(51) Int. Cl.$^7$ ............................................. G06F 17/00
(52) U.S. Cl. ................. 707/104; 707/3; 707/6; 707/7; 707/102
(58) Field of Search ................. 707/2, 6, 8, 100, 707/101, 5, 3, 9, 102, 104; 382/228; 704/256; 717/8; 345/421; 706/50; 709/9

(56) References Cited

U.S. PATENT DOCUMENTS

| | | | | |
|---|---|---|---|---|
| 5,710,916 A | * | 1/1998 | Barbara et al. | 709/9 |
| 5,832,182 A | * | 11/1998 | Zhang et al. | 706/50 |
| 5,963,956 A | * | 10/1999 | Smartt | 707/104 |
| 6,047,080 A | * | 4/2000 | Chen et al. | 382/128 |
| 6,148,295 A | * | 11/2000 | Megiddo et al. | 707/3 |
| 6,161,105 A | * | 12/2000 | Keighan et al. | 707/100 |
| 6,263,334 B1 | * | 7/2001 | Fayyad et al. | 707/5 |
| 6,289,354 B1 | * | 9/2001 | Aggarwal et al. | 707/104 |
| 6,446,068 B1 | * | 9/2002 | Kortge | 707/6 |

OTHER PUBLICATIONS

Agrawal et al., "Modeling Multidimensional Databases", IEEE, 1997, pp. 232–243.*

Kao et al., "Efficient Proximity Search in Multivariate Data", IEEE, Jul. 1998, pp. 145–154.*

Piamsa–nga et al., "A Parallel Model for Multimedia Database on Cluster System", IEEE, Jul. 1998, pp. 648–652.*

Petrakis, "Similarity Searching in Medical Image Databases", IEEE, 1997, pp. 435–447.*

Rehrauer et al., "Multiscale Markov Random Fields for Large Image Datasets Representation", IEEE, 1997, pp. 255–257.*

Yang et al., "MB+–Tree: A New Index Structure for Multimedia Databases", IEEE, 1995, pp. 151–158.*

Hou et al., "Medical Image Retrieval by Spatial Features", IEEE, 1992, pp. 1364–1369.*

* cited by examiner

Primary Examiner—Thuy N. Pardo
(74) Attorney, Agent, or Firm—Blakely, Sokoloff, Taylor & Zafman LLP

(57) ABSTRACT

The present invention provides improved techniques for spatial representation of data and browsing based on similarity. For example, improved techniques for spatial representation of image data and browsing the image data based on the similarities (or dissimilarities) of the images are provided. In one embodiment, a hierarchical MultiDimensional Scaling (MDS) database for a set of images is provided, which allows for computationally efficient querying and updating of an image database. In one embodiment, techniques for modifying an MDS database for images are provided to allow for more intuitive browsing (or searching) of the images.

15 Claims, 6 Drawing Sheets

TECHNIQUES FOR SPATIAL REPRESENTATION OF DATA AND BROWSING BASED ON SIMILARITY

CROSS-REFERENCE TO RELATED APPLICATIONS

This patent application is related to U.S. patent application entitled, "METHOD AND APPARATUS FOR UPDATING A MULTIDIMENSIONAL SCALING DATABASE", to Hawley K. Rising III, filed Oct. 20, 1998, Ser. No. 09/176,052 now U.S. Pat. No. 6,392,649 the disclosure of which is incorporated herein by reference in its entirety.

BACKGROUND

1. Field of the Invention

The present invention relates generally to browsing and database technology and, more particularly, to image browsing and image database technology.

2. Background of the Invention

Research is being performed to determine improved techniques for the representation of various types of data in a database for purposes of efficient and intuitive browsing or searching of the data. For example, some researchers have investigated the organization of objects, such as images, based on the similarities of the images. This approach is based on the model that humans perceive image data based on similarities, and thus, such an approach for a computer-implemented technique would provide a more intuitive approach.

MultiDimensional Scaling (MDS) is a well-known technique for representing various types of data in a spatial arrangement that is based on similarity or dissimilarity data. In particular, MDS can be used as a technique for storing objects, such as images, as a relative set of nodes in a low dimensional space (with respect to the size of the set). The relative location of the nodes is dependent upon the object similarities or dissimilarities, which are interpreted as a set of distances between the nodes. The object similarities or dissimilarities can be determined by a variety of techniques, which can then be used to determine the set of distances between the nodes in the MDS space.

However, MDS is a computationally expensive technique. In particular, for image databases, MDS can be impractical due to its global nature, which requires extensive matrix processing. For example, the typical MDS techniques may not be practical for larger image databases (e.g., on the order of hundreds or thousands of images). Moreover, the typical MDS techniques do not necessarily provide biologically plausible techniques for the spatial representation of data, and in particular, do not allow for intuitive browsing of, for example, images in an image database.

SUMMARY OF THE INVENTION

Accordingly, the present invention provides improved techniques for spatial representation of data and browsing based on similarity. For example, improved techniques for spatial representation of image data and browsing of stored images based on the similarities (or dissimilarities) of the stored images are provided. In one embodiment, a process for querying a computer-implemented hierarchical MultiDimensional Scaling (MDS) database for images includes measuring dissimilarity of a set of images using feature detectors; obtaining a set of distances between control points corresponding to images in a root node; performing a single node update at the root node to determine a first position in the root node of an image being queried or added; determining a first bounding box for a first subnode, in which the first subnode is a child of the root node; and determining a list of traversed nodes and traversed control points, performing a single node update at the first subnode, and sorting distances to the traversed control points in the traversed nodes, in which the first subnode is a leaf node. In one embodiment, the process further includes obtaining a list of images in a second subnode, in which the second subnode is the child of the first subnode; and repeating the performing of the single node update and the determining of a second bounding box for the second subnode.

In one embodiment, a process for a computer-implemented hierarchical spatial database of objects includes determining distances between control points corresponding to objects in a root node of the hierarchical spatial database of objects; and determining a position of a first control point in the root node for a first object, in which the first object is being queried, and in which the hierarchical spatial database of objects includes the root node and a first subnode, the first subnode being a child of the root node. The process can further include traversing a first subnode and performing a single node update on the first subnode; performing the single node update at a leaf node, the leaf node being a descendant of the first subnode; and determining traversed subnodes and traversed control points, and sorting distances between the traversed control points in the traversed subnodes and the control points in the root node to the control point for the first object. Also, for performing an add operation on the hierarchical spatial database of objects, the process can further include adding the first object to the hierarchical spatial database of objects, in which the leaf node is subdivided if the leaf node is full, and in which multidimensional scaling is executed on the leaf node and updating all bounding boxes in the traversed path to the first object. The hierarchical spatial database of objects can be initialized by executing instructions for approximating a convex hull. For example, this process can be used for browsing and modifying a hierarchical MDS database for images, in which the images are stored on one or more memories (e.g., local or remote memories of data processing devices).

In one embodiment, a process for a computer-implemented hierarchical spatial database of objects includes calculating multiple stress vectors, in which the multiple stress vectors represent stress factors between a first control point and multiple control points of the hierarchical spatial database of objects, and in which the multiple control points correspond to multiple objects, and the first control point corresponds to an object being queried; and mapping the multiple stress vectors to multiple deformation vectors; combining the multiple deformation vectors into a single node update vector; and updating the first control point by moving a position of the first control point based on a fraction of the single node update vector. Further, the multiple control points can include multiple source control points, and the first control point can represent a target control point, in which the calculating of the multiple stress vectors includes the following: storing values for multiple source bundle fields and multiple target bundle fields; and determining multiple source field values, the multiple source field values corresponding to the multiple source control points, the multiple source control points in a neighborhood of the target control point, in which a position of the target control point is modified using the source field values, and in which the stress on the target control point in a node of the hierarchical spatial database of objects is minimized. For example, the fields can advantageously correspond to local fields (e.g., as opposed to the global stress factor of standard MDS techniques) or anisotropic fields.

Other aspects and advantages of the present invention will become apparent from the following detailed description and accompanying drawings.

DETAILED DESCRIPTION OF THE INVENTION

Figure 1:
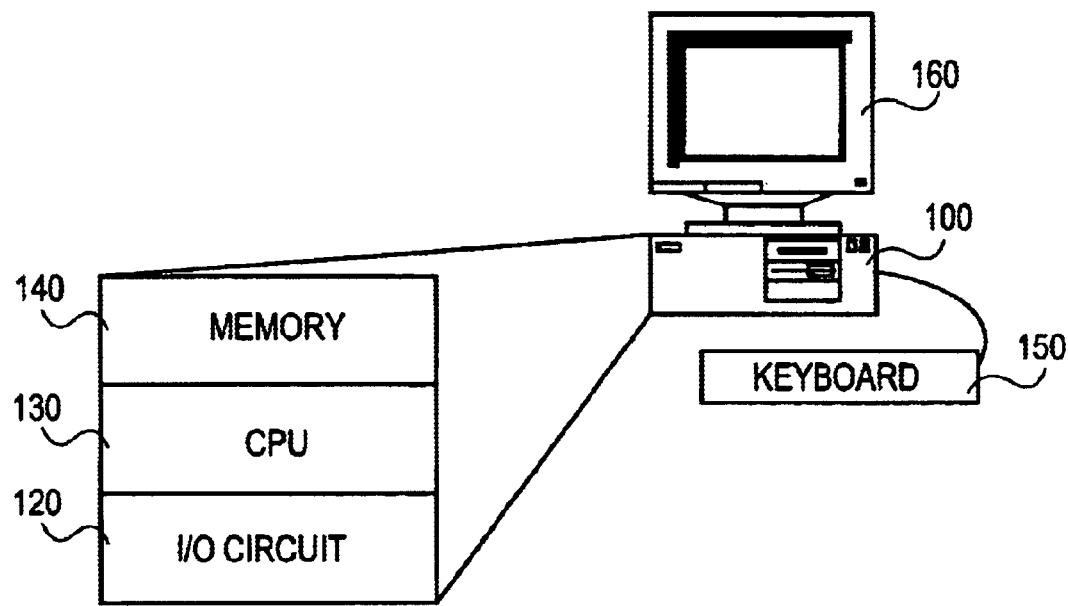
FIG. 1 is a block diagram of a data processing system in accordance with one embodiment of the present invention.

FIG. 1 illustrates a data processing system in accordance with one embodiment of the present invention. FIG. 1 shows a computer 100, which includes three major elements. Computer 100 includes an input/output (I/O) circuit 120, which is used to communicate information in appropriately structured form to and from other portions of computer 100 and other devices or networks external to computer 100. Computer 100 includes a central processing unit (CPU) 130 (e.g., a microprocessor) in communication with I/O circuit 120 and a memory 140 (e.g., volatile and non-volatile memory). These elements are those typically found in most general purpose computers and, in fact, computer 100 is intended to be representative of a broad category of data processing devices.

A raster display monitor 160 is shown in communication with I/O circuit 120 and issued to display images (e.g., video sequences) generated by CPU 130. Any well-known type of cathode ray tube (CRT) display or other type of display can be used as display 160. A conventional keyboard 150 is also shown in communication with I/O circuit 120.

It will be appreciated by one of ordinary skill in the art that computer 100 can be part of a larger system. For example, computer 100 can also be in communication with a network, such as connected to a local area network (LAN) or the Internet.

In particular, computer 100 can include circuitry that implements improved techniques for spatial representation of data and browsing based on similarity in accordance with the teachings of the present invention. In one embodiment, as will be appreciated by one of ordinary skill in the art, the present invention can be implemented in software executed by computer 100 (e.g., the software can be stored in memory 140 and executed on CPU 130), as further discussed below.

The present invention can also be implemented in circuitry, software, or any combination thereof for various other types of data processing devices. For example, the present invention can be implemented in a digital camera to provide for browsing and efficient storage of digital images stored in a spatial representation in a memory of the digital camera (e.g., in a local disc or removable memory, such as a floppy disc or flash memory card).

Generally, MDS techniques for spatial representation of data based on similarity or dissimilarity are computationally expensive. Moreover, spatial representation of image data in an MDS space does not account for local effects that adding an image can have on the relative location of other nearby images in the neighborhood of the added image. In other words, MDS techniques typically account for the effect of an added image using a global factor (e.g., a global factor of stress) rather than a local factor. As a result, conventional MDS image database approaches fail to facilitate intuitive browsing of images, and moreover, a conventional MDS image database approaches are computationally expensive for executing query and add operations.

Accordingly, in one embodiment, a technique for a computationally efficient spatial representation of images in a database and intuitive browsing of the stored images based on similarity is provided. The technique advantageously utilizes a hierarchical MDS technique (e.g., a tree-based hierarchy) for computational efficiency (e.g., a technique for accessing a hierarchical MDS database for images that is of order less than O(N), such as O(log(N))). Moreover, the technique implements an MDS database that can account for local effects, which facilitates intuitive browsing of the images.

Specifically, in one embodiment, a hierarchical MDS database is provided. More specifically, a hierarchical MDS database is provided by mapping data, such as image data, in a space referred to as a manifold. A manifold, in general, is a space X together with a set of homeomorphisms $\{\phi_i\}$, $\phi_i$: $X \to \Re^n$, such that for each $x \in X$, $\phi_i(x)$ is defined for some i. In this case, n is the dimension of the manifold, and X inherits metric space topology from $\Re^n$. In general, $\phi_i$ is expected to be more than a homeomorphism, and different types of manifolds can be defined by describing how the charts $\phi_i$ interact where they overlap. For instance, a differentiable manifold is a manifold such that $\phi_i {}^\circ \phi_j^{-1}$ is a diffeomorphism for all pairs (i,j).

Thus, a manifold can be used to construct a hierarchical MDS space, which is flexible and nonlinear. In particular, an MDS space for images can be implemented as a manifold, and interactions between charts compatible with MDS can be defined. Although global mapping created by MDS may not be provided in this approach, the ability to describe a space in which feature descriptions change with location is provided. Also, an improvement in computational efficiency due to the hierarchical structure of the MDS database is provided, as described below.

A configuration represents a set of points together with a set of labels for the points. Thus, two configurations can describe the same objects if there are two sets of points that share the same labels. For the purposes of implementing MDS, to each pair of labels, a proximity is assigned, and a mapping from the set of proximities to a set of distances within the embedding space is provided. Two configurations have non-empty intersection or overlap if they share objects and, therefore, their labels and proximities. In particular, the labels are associated with objects, whereas the points provide a particular representation of the objects. The proximities are likewise attributed to the objects, whereas the distances are related to a particular representation. A set of objects can have more than one representation, and these representations are the configurations. In other words, the objects represent control points determining the shape (e.g., deformation) of the image space. Therefore, a nonlinear manifold is described, which is at any point a continuous map of $\mathfrak{R}^n$. The twists and turns of the manifold can usually be described by the description of a discrete set of control points. These control points are embedded in neighborhoods (e.g., a particular node in the hierarchical MDS space corresponds to a particular neighborhood), which are copies of open sets in $\mathfrak{R}^n$, and mappings between such neighborhoods are defined by their actions on the control points.

For example, to define the relationship between neighborhoods where there is overlap, a relationship via scaling transformations is described below. A relaxation transformation of one configuration into another configuration of the same object is a Procrustes transformation composed with an MDS optimization. Thus, the Procrustes transformation of the first configuration lies in the basin of attraction of the second configuration. Also, two configurations, X and Y, are related to one another by relaxation transformations if there is a configuration Z and two relaxation transformations f and g such that X=f(Z) and Y=g(Z). If two configurations are related to one another by relaxation transformations, then the configurations represent elastic deformations of each other. Also, if two configurations describe the same objects but are not elastic deformations of each other, then the configurations represent plastic deformations of each other.

Accordingly, the nonlinear space in which a hierarchical spatial database can be embedded (constructed) is now described in greater detail. An MDS manifold is a manifold, together with a set of configurations, such that to each configuration there corresponds a chart ($\phi$,U) of the manifold, with the property that if two such configurations and charts overlap, then the two configurations are elastic deformations of each other. It should be noted that if one were to cause stress to a small volume of an elastic medium, then that stress could be broken down into four parts: force on the entire volume that could be alleviated by moving the volume to a new location, a force on the volume that could be alleviated by rotating the volume rigidly, a force that could be alleviated by expanding the volume or contracting the volume, and a force that could be alleviated by deforming the volume. The latter is the stress expressed by the stress tensor in continuum mechanics. The first three parts are subsumed by the Procrustes transformation. If the object could not relax back to a state of no stress, it would need to undergo a change in form to return to equilibrium, which is known as a plastic deformation.

Thus, MDS transformations can be represented as deformations of the MDS manifold itself, which minimize stress in the MDS manifold. Stress for MDS can be represented as some (possibly normalized) cost function that compares the distances into which the proximities are mapped with the distances in the configuration. For example, stress can be determined based on the action of each of the determined points on each of the other control points. In particular, each (control) point is viewed as creating a field that induces a force on the other points, and thus, causes a stress at the other points.

A sphere bundle over a manifold B is a space $E=S^{n-1} \times B$, together with the original manifold B, and a mapping $\pi$, taking any element in (s,b) $\in$ E to the point b on B. Generally, a sphere bundle over a manifold is a space with a sphere attached to each (control) point in the MDS space. A large collection of vector fields can be represented as a scalar field on E, together with the assignment of an angle (i.e., direction) to each point b. The vector at b is then the vector having direction assigned by the angle, and length assigned by the scalar corresponding to it on E.

A backprojection of a sphere bundle over a set of points is a function from the fibers of the bundle to the real numbers. In other words, it takes all the values on the sphere over a point and calculates a single real number. Thus, it is a function f: $E \rightarrow \mathfrak{R}$, given by $f(s,b)=f(\pi^{-1}(b))$, which is a scalar field on B.

A vector backprojection of a sphere bundle over a set of points is a function from the fibers of the bundle to values on the fibers over the bundle. In other words, it takes all the values on the sphere over a point and calculates a single vector in the bundle at that point (i.e., calculates a single real number and a direction).

The action of a point in an MDS manifold on another point of the MDS manifold is a value on the fiber over the acted on point. The value is added to other actions that have values at the same position on the fiber.

The vector stress at a point x in an MDS manifold is a vector backprojection of the accumulated actions at x due to the other points within a neighborhood of x. Thus, this approach allows for an implementation of MDS using local effects of stress, as further discussed below with respect to FIG. 6.

One form of vector stress is caused by real deformations. Stress caused by real deformations can be implemented using the technique for a single node update, as further discussed below with respect to FIG. 5. In this case, the stress is calculable by a discrepancy between the mapping of proximities into distances and the configuration. A hierarchical spatial database and various program modules employing these techniques are described below with respect to FIG. 2.

Figure 2:
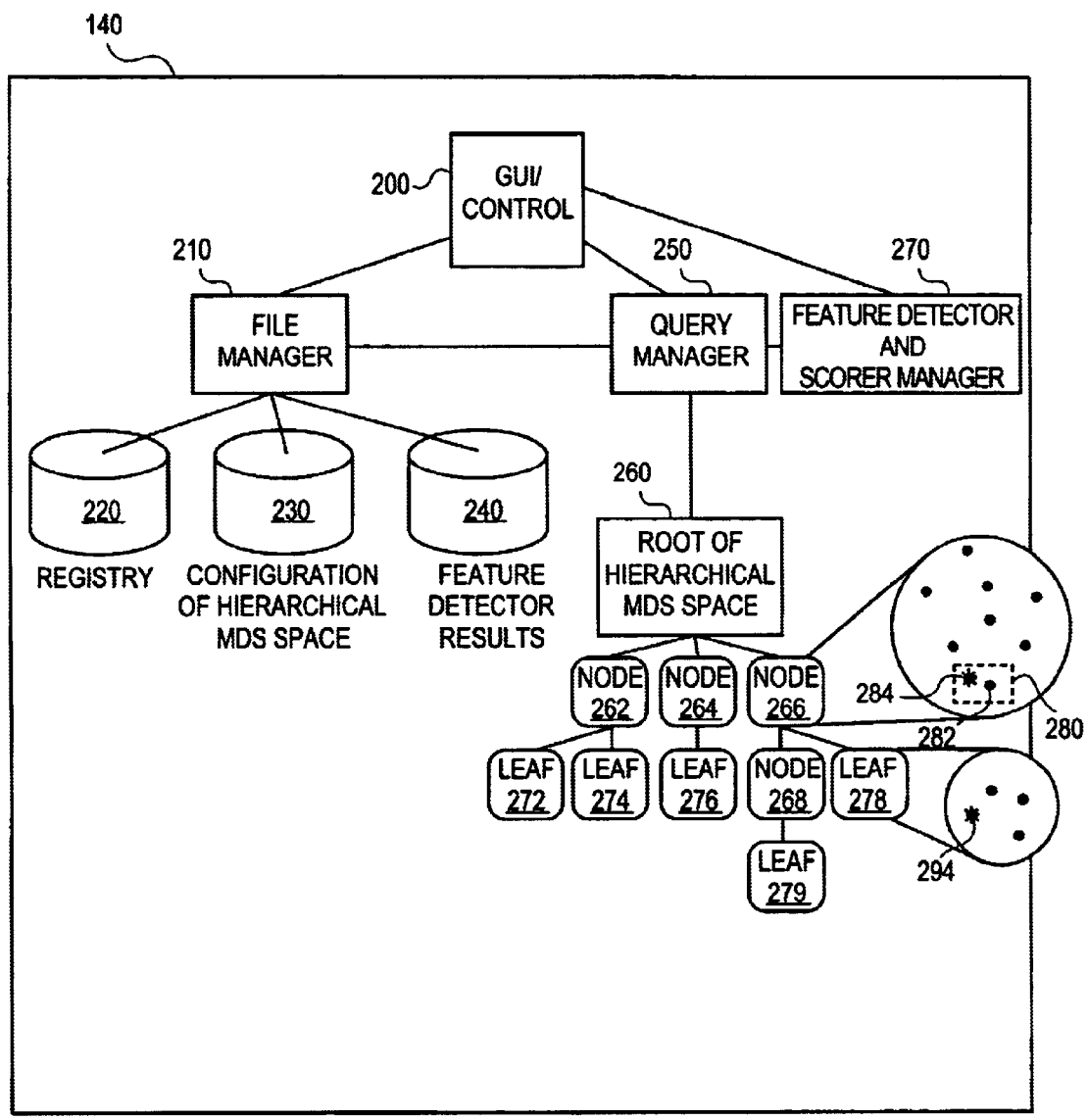
FIG. 2 is a block diagram of the various program modules and a hierarchical spatial database for images stored in the memory of FIG. 1 in accordance with one embodiment of the present invention.

FIG. 2 is a block diagram of the various program modules and a hierarchical spatial database for images stored in the memory of FIG. 1 in accordance with one embodiment of the present invention. The program modules can be implemented in a variety of programming languages such as JAVA, C++, or any other programming language, or any combination of programming languages, and executed on CPU 130. In particular, FIG. 2 illustrates various program modules and an image database stored in memory 140. As shown in FIG. 2, a Graphical User Interface(GUI)/control module 200 is in communication with a file manager 210, a query manager 250, and a feature detector and scorer manager 270. For example, various program modules and databases can communicate via message passing.

Feature detector and scorer manager 270 is used to compute scores for an image to be queried or added relative to other images in a given node. Various feature detectors and scoring techniques can be used as would be apparent to one of ordinary skill in the art. The feature detector(s) and scorer of feature detector and scorer manager 270 form distances to these points that are sent to a feature detector results 240.

File manager 210 manages a registry 220 (e.g., maintained in a file or a database), a configuration of hierarchical MDS space 230 (e.g. maintained in a file or a database), and feature detector results 240 (e.g. maintained in a file or a database). Registry 220 stores locations of the images, such as the locations of image files stored in memory 140 or in another local or remote memory, such as a URL for a World Wide Web site location accessed via the Internet. Registry 220 also stores locations of the feature detectors that can be loaded to interpret the data stored in feature detector results 240. Configuration of hierarchical MDS space 230 includes configuration data for reconstruction of the hierarchical MDS space (that was previously constructed). Feature detector results 240 stores the results of the feature detector analyses for each image represented in the hierarchical MDS space. For example, if a color histogram feature detector and a wavelet feature detector are applied to an image, then feature detector results database 240 stores a set of histogram and a set of wavelet coefficients for the image. Query Manager 250 interacts with and modifies the hierarchical MDS space for querying and adding images. For example, query manager 250 executes various other program modules and dynamic library links to perform various operations including initializing, modifying, and querying the hierarchical MDS space, as further discussed below.

A functional depiction of the hierarchical MDS space, as described above, is also illustrated in FIG. 2. In particular, the hierarchical MDS space is implemented as a set of spaces corresponding to the above-described MDS manifolds. The hierarchical MDS space includes a root node 260. In one embodiment, the root point set is returned via an OS-independent callback mechanism (e.g., implemented via try/catch blocks in C++). The next lower layer of nodes (i.e., subnodes) includes nodes 262, 264, and 266. The next lower layer of nodes includes leaf nodes 272, 274, 276, and 278, and a node 268. The lowest layer of nodes includes a leaf 279, which is a child node (or leaf) of node 268. FIG. 2 also illustrates an exploded view of node 266 and its leaf node 278. The (control) points (control points are discussed above) in each of the exploded views of node 266 and leaf node 294 correspond to data objects, such as images. For example, point 282 corresponds to a particular image, and the dashed box surrounding point 282 corresponds to its bounding box, which is the bounding box describing leaf node 278. The asterisk point 284 corresponds to an image that is being queried or is to be added, and as illustrated, it falls within bounding box 280. Thus, the image being queried/added is shown in the exploded view of leaf node 278 as asterisk point 294. In one embodiment, root node 260 includes about 20 points, and the subnodes include fewer than 20 points. For example, a leaf node may only include a few points.

Figure 3:
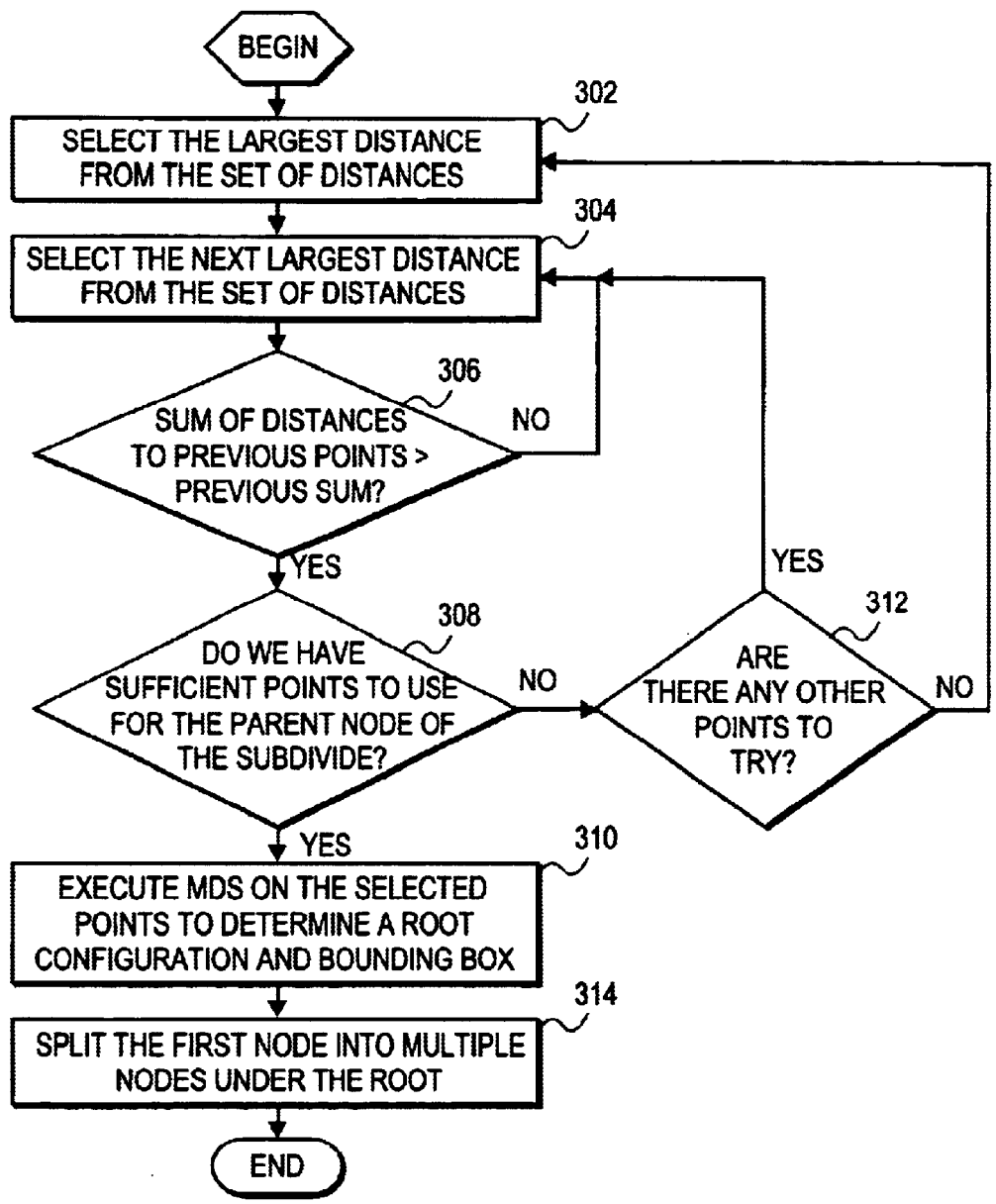
FIG. 3 is a flow diagram of an initialization of the hierarchical spatial database of FIG. 2 in accordance with one embodiment of the present invention.

FIG. 3 is a flow diagram of an initialization of the hierarchical spatial database of FIG. 2 in accordance with one embodiment of the present invention. In particular, FIG. 3 provides a technique for determining points in a hierarchical MDS space that approximate a convex hull (or at least ensure that the selected points are not merely a clump of points that are relatively near each other). The hierarchical image space of FIG. 2 is created by initial input of a starting set of distances (e.g., between images). There is a maximum number of such images that are allowed in any node or subnode (i.e., top layer or lower layers of the hierarchical space) before it is either split or subdivided (e.g., using a median cut). The root node (i.e., top layer), which also contains information about the global properties of the hierarchical MDS space, is given a larger number of image distances (e.g., about 20 images can be represented in the root node). In this embodiment, the root node approximates the convex hull of these distances by the technique illustrated in the flow diagram of FIG. 3 and described below.

Referring to FIG. 3, at stage 302, the largest distance is selected from the set of distances, and the two points to which it corresponds are recorded. These two points must be on the convex hull, because if these two points are interior to any simplex constructed from convex hull points, a contradiction via the triangle inequality results. At stage 304, the next largest distance from the remaining set of distances is selected. Either this distance has one or no points in common with the first, and add one or two points to the set. All distances are arranged in a triangle, representing the lower triangular portion of a matrix of distances between the selected points. In particular, the triangle is arranged such that each row of the triangle sums to a value greater than the row above, and the next largest distance is selected to add points. At stage 306, whether the sum of distances to the previously selected points is greater than the previous sum is determined. If so, operation proceeds to stage 308. Otherwise, operation returns to stage 304. Referring to stage 308, whether sufficient points have been obtained to use for the parent node of the subdivide is determined. If so, operation proceeds to stage 310. Otherwise, operation proceeds to stage 312. At stage 312, if there are remaining points to try, then stages 304 and 306 are repeated, and if there are not any remaining points to try, operation returns to stage 302. This initialization technique can advantageously be implemented without any full sorts by pushing all the distances onto a heap to start. As many points from the heap as are needed can be drawn to complete the set.

It will be observed that the reason that the technique should choose widely spaced points in two dimensions is again due to the triangle inequality. In general, however, the most widely separated points are obtained if each new point is maximally distant from the points chosen, with the minimum variation in the distances from these points. This ensures that none of the distances to the new point are small, preventing it from being interior and close to a previously selected point. The above-described technique ensures that the total set of distances to the new point are not smaller than a set of distances one less in cardinality with larger distances, which helps to prevent any of the new distances from being small. Although this will not guarantee that the convex hull will be found, because in this embodiment the number of desired points is fixed (e.g., 20 points for the root node) and could be more or less than the number of points in the convex hull, this technique provides a computationally efficient approximation of the convex hull.

At stage 310, full MDS is executed on the selected (control) points to determine a root configuration and bounding box. The distances to these points from the other points in the initial set are stored in configuration 230, and the remaining points are given starting configuration coordinates relative to this hierarchical MDS space by the single node update procedure, which is discussed below with respect to FIG. 5. The selected points are positioned in the first node (root node), and the positions of the points in the first node are stored in configuration 230.

At stage 314, the first node is split into multiple nodes under the root, using a median cut technique. This splitting operation proceeds until the nodes are small enough or the set of nodes is full. In the former case, MDS is then run on the leaf nodes, and the initial MDS space is completed, and stored in configuration 230. In the latter case, the nodes that contain many members can be subdivided. Thus, this technique for the root node is recursively applied to the subnodes. It is important to notice that multiple bounding box descriptions are generated to effect the MDS manifold structure. For example, the root node retains its own bounding box, plus the bounding box in the root node coordinates of its children. Each of these children likewise holds its own bounding box, and those of its children in its own coordinate chart. It should be apparent to those of ordinary skill in the art that the bounding box that the root node holds describing child node i is not the same as the bounding box that i holds describing itself. A point in this space has a description in coordinates only with respect to a specific chart, which corresponds to a particular node in the hierarchy. Consequently a complete description of a particular set of coordinates includes an identifier for the node at which they are realized. In one embodiment, the stages of operation of FIG. 3 are implemented as program instructions stored in query manager 250 (e.g., or a program module or dynamic link library called by query manager 250) and executed on CPU 130.

Thus, the properties (i.e., requirements) of an MDS manifold are satisfied by creating such a spatial hierarchy. Specifically, this spatial hierarchy is consistent with the MDS manifold description provided above. More specifically, the MDS manifold description includes a chart ($\phi$,U) plus a set of coordinates ($x_1, \ldots, x_n$) in $\Re^n$, which locate the point on the manifold as $\phi^{-1}(x_1, \ldots, x_n)$. The chart is encapsulated by the node, the map $\phi$ is found by single node update, and the resulting set of coordinates is for that chart only. Accordingly, the disclosed hierarchical MDS technique provides an example of a nonlinear spatial representation of data, which allows for a more computationally efficient spatial representation of data, such as images.

Figure 4:
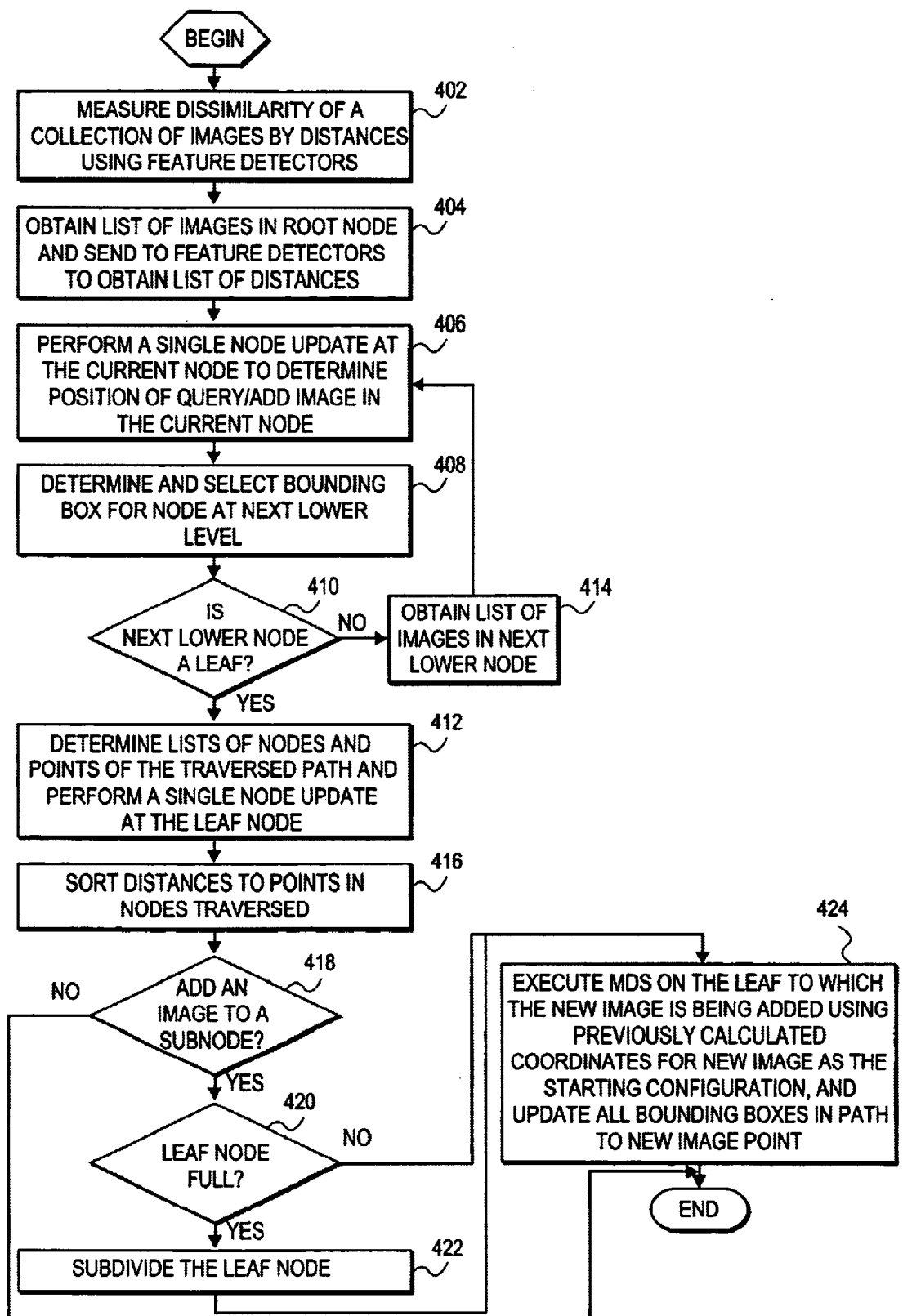
FIG. 4 is a flow diagram of a query and an add performed on the hierarchical spatial database of FIG. 2 in accordance with one embodiment of the present invention.

FIG. 4 is a flow diagram of a query and an add performed on the hierarchical spatial database of FIG. 2 in accordance with one embodiment of the present invention. In particular, a technique for accessing a hierarchical MDS database that is of order less than O(N) is now described. First, a large collection of images (e.g., on the order of hundreds or even thousands (or more) stored images) is provided or obtained. At stage 402, the dissimilarity of the collection of stored images is measured as distances using some feature set (e.g., the feature set may be application specific), using feature detector and scorer manager 270. At stage 404, a list of images in the root node is obtained and sent to feature detectors and scorer manager 270 to obtain a list of distances between the images (control points) in the root node. At stage 406, in order to determine a position in the current node of the image being queried/added, a single node update (as described below with respect to FIG. 5) is performed at the current node (e.g., root node or a subnode), taking the coordinates found at the node above as initial conditions to the single node update at the current node. At stage 408, a bounding box around the found coordinates for the node at the next lower layer is determined. In other words, some of these images are "pushed" down to the nodes below the top layer by allowing their configuration at the top layer to be initial conditions for their positions in the lower layers of the hierarchical MDS database.

At stage 410, whether the next lower node is a leaf node is determined. If so, operation proceeds to stage 412. Otherwise, a list of images in the next lower node is obtained, and the list is sent to feature detectors and scorer manager 270 to obtain a list of distances between the images in that node, at stage 414, and stages 406 and 408 are then repeated. At stage 412, lists of nodes and points of the traversed path are determined, and a single node update at the leaf node is executed. At stage 416, the distances to the points in the traversed nodes are sorted. At this point, the appropriate images can be displayed (e.g., output on monitor 160) in order of similarity based on the sorted list using Graphical User Interface(GUI)/control module 200. Accordingly, a user of the MDS system for images can browse the images based on the sorted results.

At stage 418, it is determined whether an add operation is desired. If so, operation proceeds to stage 420. At stage 420, whether the leaf node is full is determined. If so, the leaf node is appropriately subdivided at stage 422. At stage 424, full MDS is executed on the leaf node to which the new image is being added using previously calculated coordinates for the image being added as the starting configuration, and all bounding boxes in the traversed path to the new control point are updated. In one embodiment, a previous query for an image can be stored in memory (e.g., a flag is set) such that if the same query is requested again, the query operation described above need not be repeated (assuming that the hierarchical MDS database has not changed since the last query).

Accordingly, FIG. 4 provides a less than O(N) implementation, and in particular, an O(log(N)) implementation is provided for querying or adding an image to the hierarchical MDS database. In one embodiment, the stages of operation of FIG. 4 are implemented as program instructions stored in query module 250 (e.g., or a program module or a dynamic link library called by query module 250), and executed on CPU 130.

For example, adding an image is done by first applying the above query technique, updating all necessary bounding boxes, and adding the point to the necessary leaf nodes. In the leaf nodes, this may or may not cause either a split, if there is space at the current node, or a subdivide, if there is not space at the current node.

A single node update technique for reducing the computational complexity of updating single nodes in an MDS configuration is disclosed in co-pending U.S. patent application entitled, "METHOD AND APPARATUS FOR UPDATING A MULTIDIMENSIONAL SCALING DATABASE", to Hawley K. Rising III, filed Oct. 20, 1998, Ser. No. 09/176,052, which is hereby incorporated by reference in its entirety. In particular, a vector sum is calculated at the point of the single node, via the formula $$x_i^{k+1} = \frac{1}{n}\sum_{j \neq i} \frac{\delta_{ij}}{d_{ij}} u_{ij} = \frac{1}{n}\sum_{j \neq i} \delta_{ij} \hat{u}_{ij}^k$$

where $$\hat{u}_{ij}^k \equiv \frac{u_{ij}^k}{\|u_{ij}^k\|}$$

is a unit vector in the direction from $x_j^k$ to $x_i^k$. The vector calculated above is an expression of the deformation at the point $x_i^k$ due to stress. This stress is calculable via the standard cost functions for MDS.

However, in accordance with the teaching of the present invention, the above vector quantity can advantageously be associated with the stress at the point $x_i^k$ by Hooke's law. In particular, it is possible to associate any quantity with the deformation perceived by the point $x_j^k$ at the point $x_i^k$, so long as there is a field that gives the mapping of vectors at $x_j^k$ to vectors at $x_i^k$. The field then becomes a mapping on the sphere bundle over the space (usually real Euclidean space) in which the MDS configuration is represented. As a result, the deformation is an inference, in which a perceived stress at $x_j^k$ is mapped to an inferred deformation at $x_i^k$. The field over the sphere bundle gives the logical rule for carrying out this inference. The set of inference data that are mapped onto the sphere over $x_i^k$ are combined in the single node update procedure by vector addition, but this is not required. Their combination constitutes a scalar or vector backprojection, and the rule used to combine them therefore determines the update taken.

Rather than looking for metric spaces in which the data fit best, the above-described single node update technique can be used to provide properties to the metric space chosen. In particular, the metric space acts as a perfectly elastic continuum under the standard global stress model. The metric space can be modified to have any continuum properties under the above procedure, as further discussed below.

Figure 5:
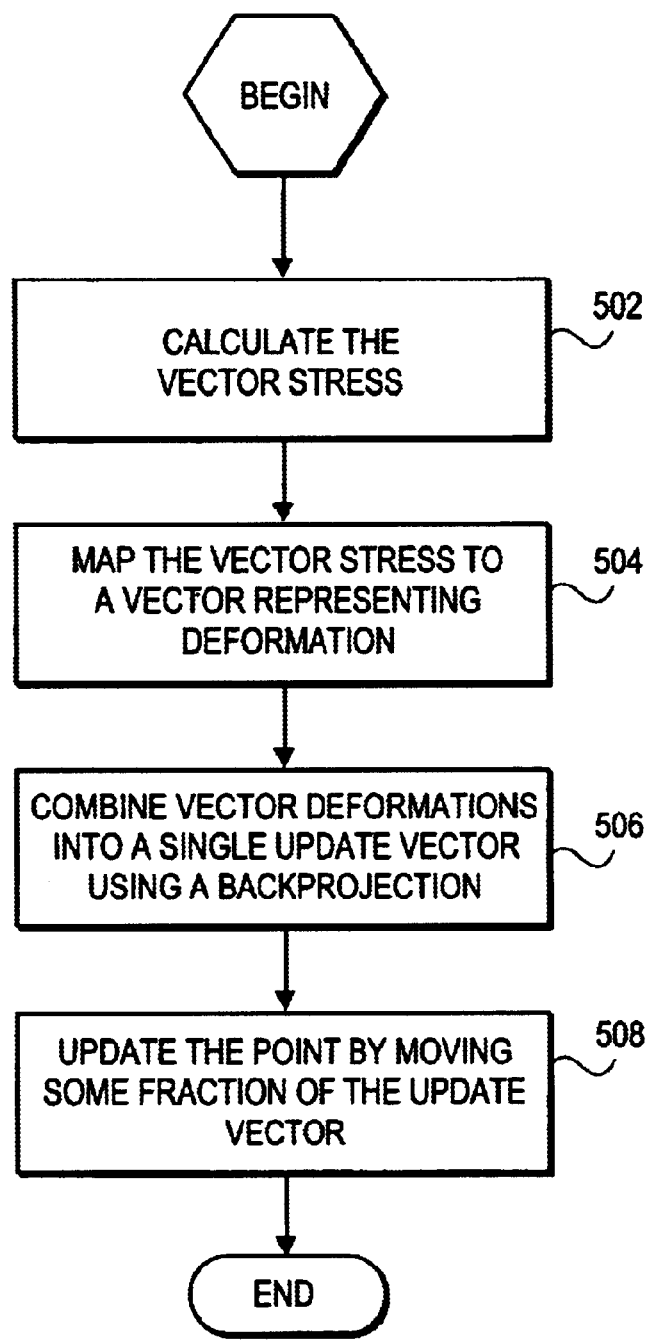
FIG. 5 is a flow diagram of a single node update of the hierarchical spatial database of FIG. 2 in accordance with one embodiment of the present invention.

FIG. 5 is a flow diagram of a single node update of the hierarchical spatial representation of images of FIG. 2 in accordance with one embodiment of the present invention. At stage 502, the vector stress $$\frac{\delta_{ij}}{d_{ij}}$$

due to the point $x_j^k$ at $x_i^k$ is calculated. For example, the vector stress calculation need only be performed when both source and target fields are non-zero (e.g., fields can vary based on distance or direction to provide local effects, such as only effects in their neighborhood in the MDS space rather than global effects, as further discussed below). In one embodiment, each target (destination) point, lists source points that are within its range (for purposes of having stress effects on the target point), and then from that list of points, it is determined whether the target point is within the range for each of the source fields of the points in the list. This approach advantageously allows for local effects of stress, rather than simply global effects, which provides a more computationally efficient MDS model and also provides a biologically more plausible MDS model, that allows for more intuitive browsing of images stored in the hierarchical MDS database. This approach is described in greater detail with respect to FIG. 6.

At stage 504, the field rule can be used to map this to a vector at $x_i^k$ representing deformation. At stage 506, the backprojection rule can be used to combine the vector deformations at $x_i^k$ into a single update vector. At stage 508, $x_i^k$ is updated by moving some fraction of the update vector. In one embodiment, the stages of operation of FIG. 5 are implemented as program instructions stored in query manager 250 (e.g., or in a program module or dynamic link library called by query manager 250) and executed on CPU 130.

Browsing or searching a spatial-related database should be intuitive. In other words, the spatial representation of data in an MDS database should provide a representation of data that allows for intuitive browsing or searching of the stored data. For example, it is desirable for an MDS model of image data to be consistent with (accurately model) human perception of the relationships among such image data.

Accordingly, a biologically plausible implementation for MDS is provided in accordance with one embodiment of the present invention. For example, MDS can be described as a juxtaposition of a memory stage, which uses Self-Organizing Maps (SOM), and a Radon transform method for detecting change, which has been accepted as a biologically plausible model. Reichardt detectors can be constructed for many types of data and can be modified to use different types of tests for fit. When combined with the SOM stage, this becomes an adaptable form of spatial organization. In particular, it is observed that if the image control points are regarded as cluster centers, then vector data given by Radon transforms and Reichardt detectors provides the input necessary to generate the herein disclosed and improved MDS model. As a result, this suggests that the herein disclosed and improved MDS model corresponds to a biologically plausible MDS implementation. Accordingly, in one embodiment, techniques for local fields and overlap patches for MDS-based databases are provided.

For example, a biologically plausible implementation of an MDS-based image database advantageously allows for more intuitive browsing of images. In particular, in one embodiment, a bundle description of a generalized MDS technique is provided. This description splits the bundle description of MDS, which is discussed above, to allow for observer and observed, or prototype and new object distinctions, to be made in viewing an MDS generated space. For example, adaptive field representations of user preferences, adaptive field representations of locality of similarity, adaptive field mappings that allow re-orientation, and modification of less than perfect feature detector output to fit recognition systems can be modeled in the MDS database. The technique for this embodiment is to generate a field at each control point, which represents the influence of the control point, and then to generate a field at the new control point. The interaction of these fields produces flexibility in the MDS space, as illustrated and discussed below with respect to FIG. 6.

Figure 6:
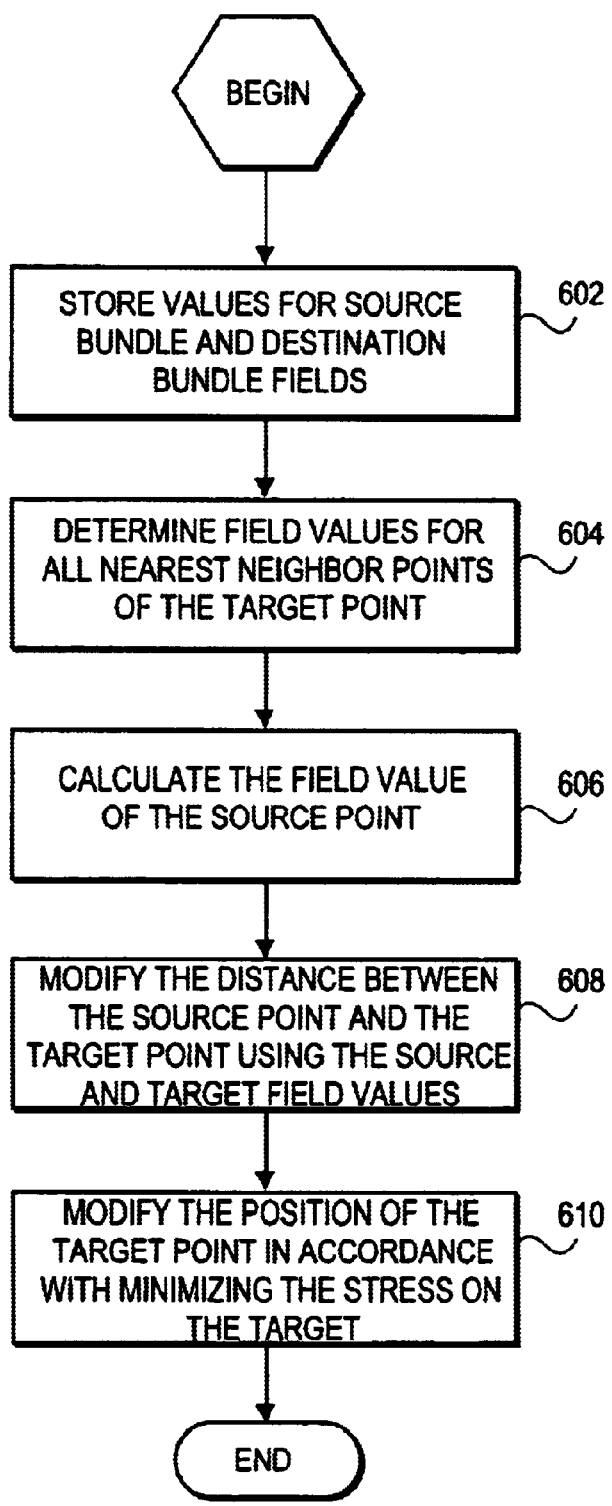
FIG. 6 is a flow diagram of a biologically plausible implementation of the hierarchical spatial database of FIG. 2 that allows for more intuitive browsing of the images in accordance with one embodiment of the present invention.

FIG. 6 is a flow diagram of a biologically plausible implementation of the hierarchical spatial database of FIG. 2 that allows for more intuitive browsing of the stored images in accordance with one embodiment of the present invention. In particular, implemented the MDS database using the pair of bundles allows for the following biologically plausible implementation of the MDS database. At stage 602, the fields for the source bundle and target bundle are determined as either formulaic expressions, storing any coefficients that are used to adapt a particular point, or as lookups, storing values that will be modified. At stage 604, at the target point, the field values for all nearest neighbor points are determined (e.g., calculated or looked up in memory). The field values that are not zero include a list of points to evaluate. At stage 606, for each point to evaluate, the field value of the source point is determined. At stage 608, the distance between the source point and the target point is then modified by multiplicative application of the source and target field values. At stage 610, the position of the target point is modified in accordance with minimizing the stress on the target point. In one embodiment, the stages of operation of FIG. 6 are implemented as program instructions stored in query manager 250 (e.g., or in a program module or dynamic link library called by query manager 250) and executed on CPU 130.

In one embodiment, elasticity and viscosity in the context of MDS-related stress is also used to generate the local fields described above with respect to FIG. 6. In particular, viscosity represents the ability of the system to react to stress at a distance, and elasticity corresponds to the division between adaptation and accommodation. In particular, elasticity corresponds to the relative amounts of accommodation/adaptation versus reaction/correction. Accordingly, elasticity can be used for techniques for developing adaptations to feature detector input in an MDS system. For example, models relying on extensions of fluid models of viscous stress and elastic stress simplify the creation of adaptive fields, because behavior can be predicted using models from fluid and continuum dynamics. In particular, modifying an MDS system using elasticity and viscosity advantageously allows for the modeling of multiple known effects in similarity experiments based on human perception. As a result, a variety of parameters can be ascertained by modeling multiple known effects in similarity experiments, such as accommodation, asymmetry, locality, and continuity. The modeling of an explicit elasticity at the target point allows explicit modeling of accommodation. This modeling can take the form of a formulaic value for the elastic strain, or just a readjustment of the proximity towards the derived distance. The modeling of an explicit split between source and target, and the modeling of each field as a scalar field on the projection bundle, which allows inhomogeneous and anisotropic fields (e.g., a source point may exert a field effect on a target point, but not vice versa) to be created between source and target points.

Locality can be modeled as follows: first, the influence of particular stored objects are of a limited range, and second, viscosity is modeled such that the size of the displacement of one part of the visual memory changes the range of objects over which memory is reorganized. For example, an MDS system for image data can be implemented such that adding images containing a significant amount of the color blue does not effect (i.e., cause a reorganization of) any images containing mostly red, unlike an MDS image system that uses a global stress factor.

Finally, continuity can also be modeled in an MDS system. For example, some differences between images are not monotonic in their differences in similarity. The MDS system in accordance with one embodiment of the present invention can account for such continuity issues by the shape and extent of the source and target fields.

Accordingly, improved techniques for spatial representation of data and browsing by similarity is provided. In one embodiment, more computationally efficient techniques for accessing a hierarchical MDS database are provided. For example, the techniques in accordance with the teachings of the present invention provide O(log(N)) computational performance for accessing a hierarchical MDS database for images, which is very important for many practical implementations of an image database that can include hundreds (or even tens of thousands) of images. One of ordinary skill in the art will recognize that these techniques can be used with databases that store a variety of different types of objects (e.g., image data, audio data, multimedia data, and textual data, in which feature detectors can vary based upon the type of data or other application specific considerations), in accordance with the teachings of the present invention.

Moreover, techniques are provided for spatial databases for objects, such as images, in which source fields and target fields allow for local effects. These techniques allow for more efficient and more intuitive browsing of images using spatial databases for images. One of ordinary skill in the art will recognize that these techniques can be used with a variety of techniques for spatial representation of data, such as Principal Components Analysis (PCA) techniques, in accordance with the teachings of the present invention.

Although particular embodiments of the present invention have been shown and described, it will be apparent to those of ordinary skill in the art that changes and modifications can be made without departing from the present invention in its broader aspects. For example, a variety of programming languages can be used to implement the techniques in accordance with the teachings of the present invention, such as the well-known C++ or JAVA programming languages, and a variety of operating system technology, file structure formats, and database technology can be utilized to implement the present invention. The present invention can also be implemented in hardware (e.g., an Application Specific Integrated Circuit) or a combination of hardware and software (e.g., a hardware/software co-design implementation). Further, the present invention can be used with a variety of image storage formats and image filtering techniques as well as a variety of feature detector and scorer techniques. Therefore, the pending claims are to encompass within their scope all such changes and modifications that fall within the true scope of the present invention.

What is claimed is:

1. A process for a computer-implemented hierarchical multidimensional scaling database for images, the process comprising:

measuring dissimilarity of a set of images using a feature detector;

obtaining a set of distances between control points corresponding to images in a root node;

performing a single node update at the root node to determine a first position in the root node of an image being queried or added;

determining a first bounding box for a first subnode, wherein the first subnode is a child of the root node; and determining a list of traversed nodes and traversed control points, performing the single node update at the first subnode, and sorting distances to the traversed control points in the traversed nodes, wherein the first subnode is a leaf node.

2. The process of claim 1 further comprising:

obtaining a list of images in a second subnode, wherein the second subnode is a child of the first subnode; and repeating the performing of the single node update and the determining of a second bounding box for the second subnode.

3. A process for a computer-implemented hierarchical spatial database of objects, the process comprising:

calculating multiple stress vectors, wherein the multiple stress vectors represent stress factors between a first control point and multiple control points of the hierarchical spatial database, the multiple control points comprise multiple source control points and correspond to multiple objects, and the first control point comprises a target control point and corresponds to an object being queried, and wherein the calculating of the multiple stress vectors further comprises:

storing values for multiple source bundle fields and multiple targets to bundle fields; and determining multiple source field values, the multiple source field values corresponding to the multiple source control points, the multiple source control points being a neighborhood of the target control point, wherein a position of the target control point is modified using the source field values, and wherein stress on the target control point in a node of the hierarchical spatial database is minimized;

mapping the multiple stress vectors to multiple deformation vectors;

combining the multiple deformation vectors into a single node update vector; and updating the first control point by moving a position of the first control point based on a fraction of the single node update vector.

4. The process of claim 3 wherein the fields comprise local fields.

5. The process of claim 3 wherein the fields comprise anisotropic fields.

6. An article of manufacture or a hierarchical multidimensional scaling of database for objects, the article of manufacture comprising:

a configuration for the hierarchical multidimensional scaling database, the hierarchical multidimensional scaling database comprising a root node and a leaf node, the leaf node being a subnode of the root node, wherein the root node and the leaf node each comprise control points corresponding to objects; and a query manager comprising:
  executable instructions for querying the hierarchical multidimensional scaling database;
  executable instructions for calculating multiple stress vectors, wherein the multiple stress vectors represent stress between a first control point and multiple control points of a node of the hierarchical multidimensional scaling database, the multiple control points comprise multiple source control points and correspond to multiple objects, the first control point comprises a target control point and corresponds to an object being queried, and the executable instructions for calculating comprise:
    instructions for storing values for multiple source bundle fields and multiple target bundle fields; and
    instructions for determining multiple source field values, the multiple source field values corresponding to multiple source control points, the multiple source control points being in a neighborhood of a target control point, wherein a position of the target control point is modified using the source field values, and wherein the stress on the target control point in a node of the hierarchical multidimensional scaling database is minimized;
  executable instructions for mapping the multiple stress vectors to multiple deformation vectors;
  executable instructions for combining the multiple deformation vectors into a single node update vector; and
  executable instructions for modifying a position of the first control point by moving the position of the first control point a fraction of the single node update vector.

7. The article of manufacture of claim 6 wherein the instructions are implemented in a C++ programming language.

8. A machine executing instructions for a hierarchical multidimensional scaling database for objects, the machine comprising:
  instructions executed on a microprocessor of the machine for managing a configuration of the hierarchical multidimensional scaling database, the hierarchical multidimensional scaling database comprising a root node and a leaf node, the leaf node being a subnode of the root node, wherein the root node and the leaf node each comprise control points corresponding to objects;
  instructions executed on a microprocessor of the machine for querying the hierarchical multidimensional scaling database, the objects being stored in a memory;
  instructions executed on the microprocessor of the machine for calculating multiple stress vectors, wherein the multiple stress vectors represent stress between a first control point and multiple control points of a node of the hierarchical multidimensional scaling database, and wherein the multiple control points comprise multiple source control points and correspond to multiple objects, the first control point comprises a target control point and corresponds to an object being queried, and the instructions executed for calculating comprise:
    instructions executed on the microprocessor of the machine for storing values for multiple source bundle fields and multiple target bundle fields; and
    instructions executed on the microprocessor of the machine for determining multiple source field values, the multiple source field values corresponding to multiple source control points, the multiple source control points being in a neighborhood of the target control point, wherein a position of the target control point is modified using the source field values, and wherein the stress on the target control point in a node of the hierarchical multidimensional scaling database is minimized;
  instructions executed in the microprocessor of the machine for mapping the multiple stress vectors to multiple deformation vectors;
  instructions executed on the microprocessor of the machine for combining the multiple deformation vectors into a single node update vector; and
  instructions executed in the microprocessor of the machine for updating the first control point by moving the first control point a fraction of the single node update vector.

9. An article of manufacture for a hierarchical multidimensional scaling of database for images, the article of manufacture comprising:
  a configuration for the hierarchical multidimensional scaling database, the hierarchical multidimensional scaling database comprising a root node and a leaf node, the leaf node being a subnode of the root node, wherein the root node and the leaf node each comprise control points corresponding to images;
  a query manager, the query manager comprising executable instructions for querying the hierarchical multidimensional scaling database of images, the instructions comprising:
    instructions for measuring dissimilarity of a set of images using a feature detector;
    instructions for obtaining a set of distances between control points corresponding to images in the root node;
    instructions for performing a single node update at the root node to determine a first position in the root node of an image being queried or added;
    instructions for determining a first bounding box for a first subnode, wherein the first subnode is a child of the root node; and
    instructions for determining a list of traversed nodes and traversed control points, performing the single node update at the first subnode, and sorting distances to the traversed control points in the traversed nodes, wherein the first subnode is a leaf node.

10. The article of manufacture of claim 9 wherein the executable instructions of the query manager further comprise:
  instructions for obtaining a list of images in a second subnode, wherein the second subnode is the child of the first subnode; and
  instructions for repeating the performing of the single node update and the determining of a second bounding box for the second subnode.

11. A machine executing instructions for a hierarchical multidimensional scaling database for images, the machine comprising:
  instructions executed on a microprocessor of the machine for managing a configuration of the hierarchical multidimensional scaling database, the hierarchical multidimensional scaling database comprising a root node and a leaf node, the leaf node being a subnode of the root node, wherein the root node and the leaf node each comprise control points corresponding to images; and instructions executed on a microprocessor of the machine for querying the hierarchical multidimensional scaling database, the images being stored in a memory, the instructions for querying comprising:

instructions for measuring dissimilarity of a set of images using a feature detector;

instructions for obtaining a set of distances between control points corresponding to images in the root node;

instructions for performing a single node update at the root node to determine a first position in the root node of an image being queried or added;

instructions for determining a first bounding box for a first subnode, wherein the first subnode is a child of the root node; and instructions for determining a list of traversed nodes and traversed control points, performing the single node update at the first subnode, and sorting distances to the traversed control points in the traversed nodes, wherein the first subnode is a leaf node.

12. The machine of claim 11 further comprising:

instructions for obtaining a list of images in a second subnode, wherein the second subnode is the child of the first subnode; and instructions for repeating the performing of the single node update and the determining of a second bounding box for the second subnode.

13. An apparatus for a hierarchical multidimensional scaling database for images, the apparatus comprising:

means for managing a configuration for the hierarchical multidimensional scaling database, the hierarchical multidimensional scaling database comprising a root node and a leaf node, the leaf node being a subnode of the root node, wherein the root node and the leaf node each comprise control points corresponding to images; and means for querying the hierarchical multidimensional scaling database, the means for querying comprising:

means for measuring dissimilarity of a set of images using a feature detector;

means for obtaining a set of distances between control points corresponding to images in the root node;

means for performing a single node update at the root node to determine a first position in the root node of an image being queried or added;

means for determining a first bounding box for a first subnode, wherein the first subnode is a child of the root node; and means for determining a list of traversed nodes and traversed control points, and further for sorting distances to the traversed control points in the traversed nodes, wherein the first subnode is a leaf node and the means for performing performs the single node update at the first subnode.

14. The apparatus of claim 13, wherein the means for querying further comprises:

means for obtaining a list of images in a second subnode, wherein the second subnode is the child of the first subnode and the means for performing and the means for determining the first bounding box are repeated for the second subnode.

15. An apparatus for a hierarchical multidimensional scaling of database for objects, the apparatus comprising:

means for managing a configuration for the hierarchical multidimensional scaling database, the hierarchical multidimensional scaling database comprising a root node and a leaf node, the leaf node being a subnode of the root node, wherein the root node and the leaf node each comprise control points corresponding to objects; and means for querying the hierarchical multidimensional scaling database, the means for querying comprising:

means for calculating multiple stress vectors, wherein the multiple stress vectors represent stress between a first control point and multiple control points of a node of the hierarchical multidimensional scaling database, the multiple control points comprise multiple source control points and correspond to multiple objects, the first control point comprises a target control point and corresponds to an object being queried, and the means for calculating comprises:

means for storing values for multiple source bundle fields and multiple target bundle fields; and means for determining multiple source field values, the multiple source field values corresponding to multiple source control points, the multiple source control points being in a neighborhood of the target control point, wherein a position of the target control point is modified using the source field values, and wherein the stress on the target control point in a node of the hierarchical multidimensional scaling database is minimized;

means for mapping the multiple stress vectors to multiple deformation vectors;

means for combining the multiple deformation vectors into a single node update vector; and means for modifying a position of the first control point by moving the position of the first control point a fraction of the single node update vector.

* * * * *